Patented Aug. 18, 1931

1,819,132

UNITED STATES PATENT OFFICE

OSKAR SPENGLER, OF NEUBABELSBERG-BERGSTUCKEN, AND HUGO PFANNENSTIEL, OF DESSAU IN ANHALT, GERMANY, ASSIGNORS TO WINTHROP CHEMICAL COMPANY, INC., OF NEW YORK, N. Y., A CORPORATION OF NEW YORK

TRICHLOROMETHYL-ETHOXY-HYDROXY-PHENYL-CARBINOL

No Drawing. Application filed April 22, 1930, Serial No. 446,402, and in Germany February 22, 1929.

Our present invention relates to a new process of manufacture of 3-ethoxy-4-hydroxybenzaldehyde. Another object of our invention is to provide a new intermediate product from which the 3-ethoxy-4-hydroxybenzaldehyde is obtainable in a very simple manner.

Further objects of our invention will be seen from the detailed specification following hereafter.

We have found that hydroxyethoxybenzene of the formula

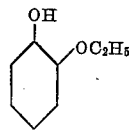

may be condensated with chloral to form trichlormethyl-ethoxyhydroxyphenylcarbinol which corresponds probably to the formula

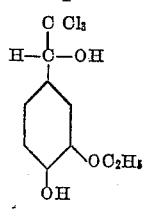

By a saponification process a corresponding carboxyl acid is obtained which by a suitable oxidizing process yields the aldehyde mentioned above.

The following examples serve to illustrate our invention, the parts being by weight:

*Example 1.*—To a mixture of 136 parts of 1-hydroxy-2-ethoxybenzene and of 148 parts of chloral are added gradually while stirring 5 parts of calcined sodium carbonate. The temperature is kept by cooling at about 20 to 25° C. The condensation occurs immediately, the reacting mass becomes thicker and finally solidifies completely. The raw product thus obtained is purified by grinding in the presence of water and, if desired, by recrystallization with xylene. 204 parts of the condensation product thus are obtained, which is 72 per cent of the theoretical amount.

The new condensation product melts at 112 to 113° C. It is very difficultly soluble in water and benzine, easily soluble in alcohols and acetone. Furthermore, it is easily soluble in hot xylene, but very difficultly soluble in cold xylene, so that it is easily recrystallized in this solvent.

In the foregoing example, the condensation may be performed by using another alkaline reacting compound instead of sodium carbonate, for instance, potassium carbonate or potassium bicarbonate; the chloral may be substituted by a corresponding quantity of chloralhydrate.

The manufacture of 3-ethoxy-4-hydroxybenzaldehyde is illustrated by the following examples:

*Example 2.*—50 grams of the condensation product obtainable according to Example 1 are boiled in a reflux apparatus with 8 liters of water for 12 hours. After addition of 75 grams of copper carbonate the solution is boiled once more for 8 hours. Sodium carbonate is added to precipitate the copper compound; from the solution freed from copper, the aldehyde is obtained by extraction with an organic solvent. The yield amounts to about 28 grams of 3-ethoxy-4-hydroxybenzaldehyde.

*Example 3.*—50 grams of the condensation product obtainable according to Example 1 are heated with 8 liters of water and 60 grams of copper oxide for 2 hours in a closed vessel to about 130° C. The aldehyde formed is separated by extraction.

The 3-ethoxy-4-hydroxybenzaldehyde thus obtainable is very similar to vanillin, however, its taste and smell is more powerful and surpasses that of vanillin about three- to fourfold.

It is obvious that the present invention is not limited to the foregoing examples nor to the specific details given therein, thus, for instance, oxidizing agents other than cupric compounds, for instance, ferric compounds, may be used; the saponification of the condensation product and its oxidation may be performed simultaneously or in separate operations in any desired succession.

What we claim is:—

As a new product the condensation product of ortho-ethoxy-hydroxybenzene with chloral corresponding probably to the formula

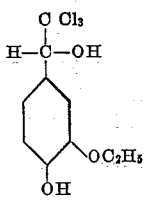

forming a crystalline powder melting at 112 to 113° C., being very difficultly soluble in water, benzine and cold xylene, easily soluble in alcohols, acetone and hot xylene and yielding 3-ethoxy-4-hydrobenzaldehyde by saponification and a suitable oxidation.

In testimony whereof we affix our signatures.

OSKAR SPENGLER.
HUGO PFANNENSTIEL.